United States Patent

[11] 3,550,605

| [72] | Inventors | Charles J. Ahern;<br>Paul T. Higgins, Sidney, N.Y.; Robert S. Kiwak, Dearborn Heights, Mich. |
|---|---|---|
| [21] | Appl. No. | 687,832 |
| [22] | Filed | Dec. 4, 1967 |
| [45] | Patented | Dec. 29, 1970 |
| [73] | Assignee | The Bendix Corporation<br>a corporation of Delaware |

[54] FLUID DEVICE WITH IMPROVED FAN-IN CAPABILITY
5 Claims, 4 Drawing Figs.

| [52] | U.S. Cl. | 137/81.5 |
|---|---|---|
| [51] | Int. Cl. | F15c 1/10 |
| [50] | Field of Search | 137/81.5 |

[56] References Cited
UNITED STATES PATENTS

| 3,107,850 | 10/1963 | Warren et al. | 137/81.5X |
|---|---|---|---|
| 3,124,160 | 3/1964 | Zilberfarb | 137/81.5 |
| 3,148,691 | 9/1964 | Greenblott | 137/81.5 |
| 3,174,497 | 3/1965 | Sowers III | 137/81.5 |
| 3,186,422 | 6/1965 | Boothe | 137/81.5 |
| 3,229,705 | 1/1966 | Norwood | 137/81.5 |
| 3,272,214 | 9/1966 | Warren | 137/81.5 |
| 3,460,556 | 8/1969 | Sowers | 137/81.5 |

*Primary Examiner*—Samuel Scott
*Attorneys*—James L. O'Brien and Plante, Arnes, Hartz and O'Brien

ABSTRACT: A fluid logic component having multiple isolated fluid pressure control input ports arranged in adjacent separated rows.

PATENTED DEC29 1970
3,550,605
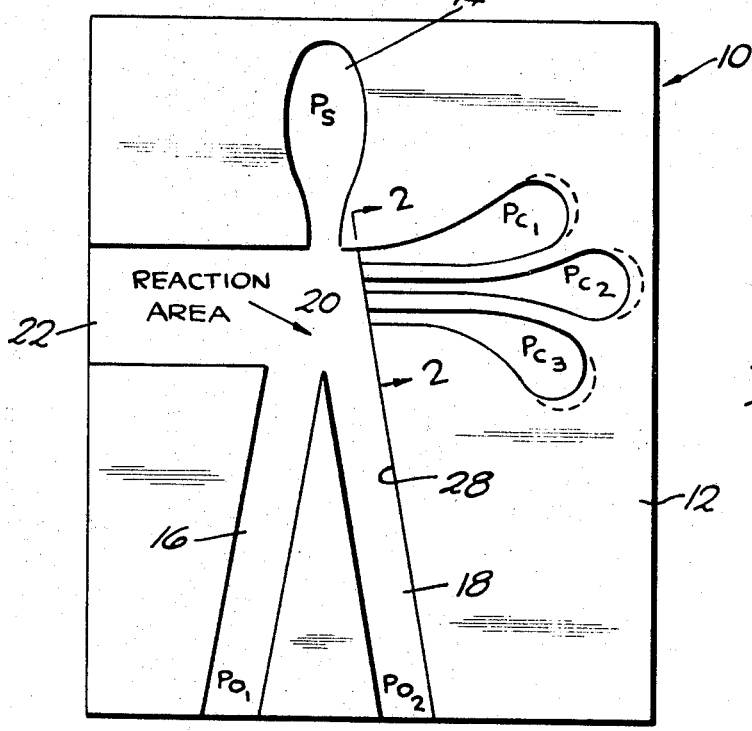
FIG. 1
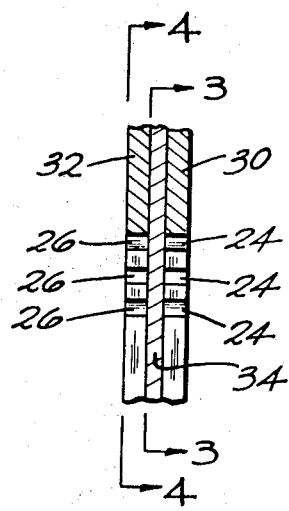
FIG. 2
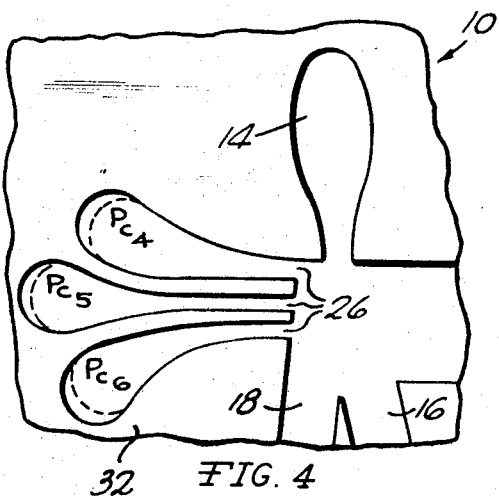
FIG. 3
FIG. 4
INVENTORS
CHARLES J. AHERN
PAUL T. HIGGINS
ROBERT S. KIWAK
BY James L. O'Brien
ATTORNEY

FLUID DEVICE WITH IMPROVED FAN-IN CAPABILITY

BACKGROUND OF THE INVENTION

It is desirable, in fluid logic components, to provide the largest possible number of control inputs. This capability in a fluid logic component makes it unnecessary to stack a number of components thereby cutting down on physical size of the logic circuitry and reducing the power necessary to operate the circuit. In the past, it has been the practice to connect several control inputs to a common plenum and take the combined signal to the reaction area in the fluid amplifier. Because of physical size limitations on the plenum design, the number of control inputs that can be connected to the plenum is limited to about five. Also, the fluid flowing into the plenum from one control input may flow out another input since the inputs are not isolated when this technique is employed. In other words, the inputs can interact, thus reducing or destroying the memory in other parts of the circuit complex. This capability of a fluid logic component to accept a number of control input flows is generally referred to as the "fan-in" capability of the component.

It is an object of this invention to provide a fluid logic component with improved fan-in capabilities.

SUMMARY OF THE INVENTION

The fluid logic component of this invention is a monostable or bistable fluid flip-flop of the Coanda or latching vortex type. These components perform digital computations with fluid mediums (gas or liquid), and are typically incorporated in a circuit for performing "OR," "AND" or "NOT" logic functions in a counter or computer. In one form of counter an AND function signifies a type of circuit whereby the output signal has a value only when all input signals are absent. A NOT/AND or OR function signifies a type of circuit which produces an output signal when any one or all of the input signals are present. Thus, it is desirable in many logic circuits to have available a logic component having a number of input signals which is as large as possible to thereby reduce the number of logic components required in the circuit. Such a reduction in the number of logic components reduces the physical size of the circuit and enables operation of the circuit with less power.

In the logic component of this invention, increased fan-in capability is accomplished by arranging a plurality of isolated control pressure input ports in a plurality of separated rows. It has been the practice in the past to arrange the input ports in a single row. Since these ports must be arranged in the attachment wall of the component at a location at which low pressure is generated by the main stream of fluid, the number of input ports that can be arranged in a single row is limited by the length of the low pressure region. In this invention, the utilization of several rows of input ports takes advantage of the width of the low pressure region as well as the length to locate a maximum number of input ports at locations in which a signal from any one of the ports will be effective to deflect the main fluid stream. In a laminated fluid logic component, this is accomplished by forming one row of input ports in one lamination, forming a second row of input ports in another lamination, and separating the input port laminations with a shim, namely, an imperforate intermediate lamination. If desired, additional input port laminations and shims can be used to further increase the fan-in capability of the logic component.

Further objects, features and advantages of this invention will become apparent from a consideration of the following description, the appended claims, and the accompanying drawing in which:

FIG. 1 is a plan view of the fluid logic component of this invention;

FIG. 2 is a fragmentary sectional view of the component of this invention as seen from substantially the line 2–2 in FIG. 1; and FIGS. 3 and 4 are fragmentary views of the logic component of this invention as seen from substantially the lines 3–3 and 4–4 in FIG. 2.

With reference to the drawing, the fluid logic component of this invention, indicated generally at 10, is illustrated diagrammatically in FIG. 1, as a monostable fluid flip-flop of Coanda type consisting of a body 12 having a fluid supply passage 14 connected to a suitable source of fluid at supply pressure, indicated as $P_s$. The body 12 is provided with two outlet passages 16 and 18 which alternately receive a main fluid stream issuing from the supply passage 14. When fluid is in the outlet passage 16, it will be at a certain pressure, indicated as $Po_1$, and when fluid is in passage 18 it will also be at a certain pressure, indicated at $Po_2$. Between the inlet passage 14 and the outlet passages 16 and 18, the body 12 is formed with a reaction area 20 which communicates on one side with a vent 22 and on the opposite side with a plurality of input ports consisting of a first row of ports 24 and a second row of ports 26. The ports 24 and 26 are located in an attachment wall 28 which forms one side of the outlet passage 18. The ports 24 and 26 are positioned at a location such that they are opposite the low pressure region created by a main stream of fluid flowing through the passage 18 and attached to the wall 28. The ports 24 communicate with separate isolated input passages connected to supplies of control pressure fluid indicated as $Pc_1$, $Pc_2$ and $Pc_3$. Similarly, the ports 26 are connected to separate isolated input passages connected to supplies of control pressure fluid indicated at $Pc_4$, $Pc_5$ and $Pc_6$.

The body 12 is formed of a plurality of laminations, only three of which are shown in FIG. 2 to illustrate that the ports 24 are formed in a lamination 30, the ports 26 are formed in a lamination 32, and a shim 34, namely, a third imperforate lamination, is disposed between the laminations 30 and 32 so as to isolate the ports 24 from the ports 26. Additional laminations (not shown) confine the main fluid stream and the fluid jets issuing from the ports 24 and 26 against lateral flow.

In the use of the component 10, assume that a main stream of fluid at supply pressure $P_s$ is flowing into the reaction area 20 from the supply passage 14. Since the illustrated component 10 is a monostable fluid amplifier, the main fluid stream will attach to the wall 28 and create a low pressure or bubble region on the wall 28 at a position transversely aligned with the control pressure input ports 24 and 26, in the absence of fluid flow into the reaction area from any of the ports 24 and 26. Thus under this condition, namely, no flow into area 20 from any of the input ports 24 and 26, the main stream will flow into outlet passage 18 to indicate the AND or NOR function. In other words, sensing of fluid in outlet passage 18 at pressure $Po_2$ indicates that all conditions which cause no flow of fluid in the input passages are present or that neither $Pc_1$, $Pc_2$, nor $Pc_3$, ........ are present.

When fluid from any one or more of the input ports 24 and 26 enters the reaction area it deflects the main fluid stream into the output passage 16 to indicate the NOT/AND or OR function. In other words, detection of fluid in outlet passage 16 at pressure $Po_2$ indicates that one or more of the above referred to conditions is not present. The main fluid stream will remain deflected into output passage 16 only so long as there is a control pressure flow through one of the ports 24 and 26, since the component 10 is monostable. The provision of the shim 34 effectively increases the number of ports 24 and 26 which can be located in the bubble region, with the result that the fan-in capability of the element 10 is increased. This result is desirable and advantageous for the reasons heretofore given.

From the above description it is seen that this invention provides a fluid logic element in which the number of usable control pressure input ports is increased by arranging the ports so that each port is spaced in a direction longitudinally of the main fluid stream from some of the other ports and in a direction laterally of the main stream from other ones of the input ports. This arrangement effectively increases the fan-in capability of the element 10 by taking advantage of the ability of control input jets which are not centered with respect to the main stream to deflect the main stream.

It will be understood that the fluid device with improved fan-in capability which is herein disclosed and described is presented for purposes of explanation and illustration and is not intended to indicate limits of the invention, the scope of which is defined by the following claims.

We claim:

1. A fluid device comprising means for directing a stream of fluid in one direction, means providing walls on transversely opposite sides of said stream, means in at least one of said walls forming a first plurality of control fluid input ports spaced apart in said one direction, and means in said one wall forming a second plurality of control fluid input ports spaced apart in said one direction, said second plurality of control fluid input ports being adjacent to and spaced from said first plurality of input ports in a direction laterally of said stream.

2. A fluid device according to claim 1 further including means forming separate fluid supply passages corresponding to and communicating with said control fluid input ports.

3. A fluid logic component for performing AND, NOT/AND, OR or NOR logic functions comprising a fluid amplifier for amplifying a fluid input signal applied thereto, said amplifier including a fluid supply passage through which a main stream of fluid is flowable in one direction, wall means adjacent said passage positioned so that said main stream can lock on to said wall means and generate a low pressure region thereon, a first outlet passage located to receive said main stream when said main stream is locked on said wall means, means for deflecting said main stream away from said wall means comprising means forming a plurality of fluid control pressure input ports in said wall means substantially at said low pressure region, one of said ports being spaced apart in directions from another one of said ports longitudinally and laterally of said main stream, and a second outlet passage located to receive said main stream when said main stream is deflected by fluid directed thereagainst from one of said ports.

4. A fluid logic component according to claim 3 wherein said control pressure input ports are arranged in a plurality of rows, each row of ports including a plurality of ports.

5. A fluid logic component according to claim 4 wherein said amplifier is of a laminated construction, a plurality of said control pressure input ports are formed in one lamination, a plurality of said control pressure input ports are formed in another lamination, and a shim is disposed between said laminations so as to isolate the ports in one lamination from the ports in the other lamination.